United States Patent [19]
Wier

[11] Patent Number: 5,967,442
[45] Date of Patent: Oct. 19, 1999

[54] FORCE LIMITER FOR A SEAT BELT RESTRAINT SYSTEM

[75] Inventor: Franz Wier, Göggingen, Germany

[73] Assignee: TRW Occupant Restraint Systems GmbH, Alfdorf, Germany

[21] Appl. No.: 09/175,739

[22] Filed: Oct. 20, 1998

[30] Foreign Application Priority Data

Oct. 21, 1997 [DE] Germany ............ 297 18 663 u

[51] Int. Cl.⁶ .................................................. B60R 22/28
[52] U.S. Cl. ........................................ 242/379.1; 280/805
[58] Field of Search ...................... 242/379.1; 280/805, 280/806; 297/470, 471, 472

[56] References Cited

U.S. PATENT DOCUMENTS

| | | | |
|---|---|---|---|
| 5,558,295 | 9/1996 | Bauer | 242/379.1 |
| 5,799,893 | 9/1998 | Miller et al. | 242/379.1 |
| 5,820,058 | 10/1998 | Hirzel et al. | 242/379.1 |

*Primary Examiner*—John M. Jillions
*Attorney, Agent, or Firm*—Tarolli, Sundheim, Covell, Tummino & Szabo

[57] ABSTRACT

A force limiter for a vehicular seat belt restraint system comprises a frame, a drum rotatably mounted in said frame for winding up a belt webbing, a blocking disk coupled to the drum, and a blocking mechanism for selectively locking said blocking disk to the frame in a non-rotatable arrangement. The blocking disk is axially held at one axial end of the drum and is coupled to the drum by at least two torsion elements anchored to the opposite end of the drum.

8 Claims, 2 Drawing Sheets

FORCE LIMITER FOR A SEAT BELT RESTRAINT SYSTEM

FIELD OF THE INVENTION

The invention relates to a force limiter for a vehicular seat belt restraint system, comprising a frame, a drum rotatably mounted in the frame for winding up belt webbing, a blocking disk coupled to the drum, and a blocking mechanism for selectively locking the blocking disk to the frame in a non-rotatable arrangement.

BACKGROUND OF THE INVENTION

The intention in providing a force limiter is to limit the force maximally active in the belt webbing when the blocking system is activated to a value which is uncritical for the restrained vehicle occupant. For this purpose a torsion rod arranged within the drum may be used, for example, which is connected non-rotatably to the drum, on the one hand, and to the blocking disk on the other. In the case of restraint, when a torque as predetermined by the dimensioning of the torsion rod is exceeded, the drum can be rotated relative to the belt retractor with twisting of the torsion rod, belt webbing thereby being withdrawn from the drum and, due to the occurring plastic deformation of the torsion rod, energy is depleted to prevent any further increase in the forces acting in the seat belt.

A torsion rod having the deformation properties with good reproducibility as required for a force limiter is a complicated component.

SUMMARY OF THE INVENTION

The invention provides a force limiter for a vehicular seat belt restraint system in which the blocking disk is axially held at one axial end of the drum and is coupled to the drum by at least two torsion elements anchored to the opposite end of the drum. By employing several torsion elements in parallel it is easily possible to adjust the force level at which the limiting action occurs, to a desired value, simply by using an appropriate number of torsion elements. Each individual torsion element can be simply configured as a metal bar, for example, as a wire section.

One advantage particular to the force limiter in accordance with the invention is that due to a simple further development a force limiting characteristic can be achieved having a degressive profile, i.e. in which the force level is reduced with increasing length of belt webbing withdrawn, resulting in optimum vehicle occupant protection in combination with an inflatable restraining means (gas bag), since on starting of the restraining action of the inflatable restraining means lower belt forces are desired in order to optimize the overall load by the belt webbing and the inflatable restraining means. In accordance with the preferred embodiment of the invention the torsion elements are inserted in openings passing through the blocking disk and protrude from these openings at the side of the blocking disk facing away from the drum; at least one of the torsion elements has a smaller axial length than the other torsion elements. When the torsion elements are twisted about each other their axial length is shortened at the same time. Thus, with increasing twisting, the length of the end sections of the torsion elements protruding from the through-openings becomes smaller. When a predetermined angle of rotation between drum and blocking disk is attained, the shorter torsion element is pulled out of the corresponding through-opening in the blocking disk totally, this torsion element then counteracting any further twisting by only little remaining resistance. Accordingly, the force is limited to a lower force level. By grading the axial length of several torsion elements the force limiting characteristic can be varied in a broad range.

It is especially of advantage in a further embodiment of the invention when the blocking disk is mounted so as to be shiftable on the drum in the axial direction. The axial shifting of the blocking disk on the drum is then effected by means of a positioning system which responds to such parameters as weight of the occupant, collision intensity or actuation of the gas bag. Due to the blocking disk being axially shifted, the level in limiting the force is varied very simply. When vehicle occupant weight, or collision intensity is low the level in limiting the force is thus so low that the risk of injury is minimized. On the other hand, when the vehicle occupant weight or collision intensity is higher or in the absence of the restraining action being supported by an inflatable restraining means (gas bag), the force needs to be limited at a higher level to prevent the vehicle occupant from too big a forward displacement in the vehicle.

Further advantages and features of the invention read from the following description of several embodiments and from the drawing, to which reference is made, and in which:

DESCRIPTION OF THE PREFERRED EMBODIMENTS

Figure 1:
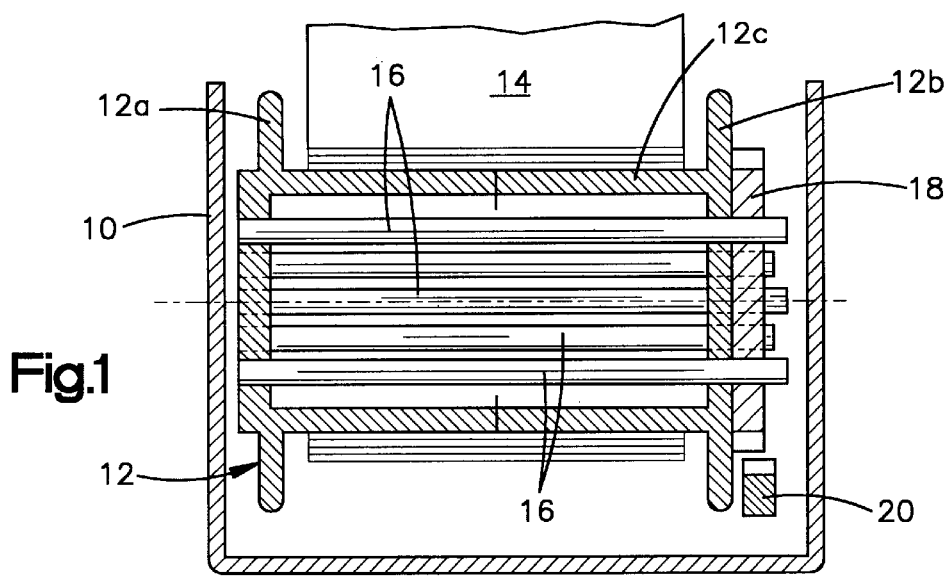
FIG. 1 is a schematic side view of one embodiment of the force limiter in its condition prior to force limiting becoming active.

In the embodiment of the force limiter as shown in FIG. 1 a drum 12 is rotatably mounted in a frame such dimensioned as to be capable of bearing load, for securing to the vehicle body, whereby the drum 12 may be the belt reel of a belt retractor, it also being possible that the force limiter is designed as a limiter at an end fitting. The belt webbing 14 of a seat belt is wound up on the drum 12. The drum 12 consists of two flanges 12a, 12b axially spaced away from each other, a hollow cylinder 12c connecting the latter and forming a shell surface area, and a number of bar-shaped torsion elements 16 arranged parallel to each other and in axial direction, of which one axial end each is anchored to the flange 12a whilst the respective other axial ends protrude over through-openings in the flange 12b. The hollow cylinder 12c consists of two portions to enable a rotation of the flanges 12a and 12b relative to each other. The belt webbing 14 is secured to the portion of the hollow cylinder 12c which is fixedly connected to the flange 12a, shown on the left side of FIG. 1. A blocking disk 18 provided on its outer circumference with a blocking toothing is located on the outside of the one flange 12b from which the ends of the torsion elements 16 protrude. The blocking disk 18 is provided with through-openings in line with those of the flange 12b. The axial length of the torsion elements is dimensioned such that their ends also protrude from the through-openings of the blocking disk 18. In the preferred embodiment the torsion elements differ in length axially, however.

Swivably mounted on the frame 10 is furthermore a blocking pawl 20. This blocking pawl 20, like the blocking toothing on the outer circumference of the blocking disk 18, is a component of a blocking mechanism for selectively blocking the blocking disk 18 to the frame 10 in a non-rotatable arrangement.

Figure 2:
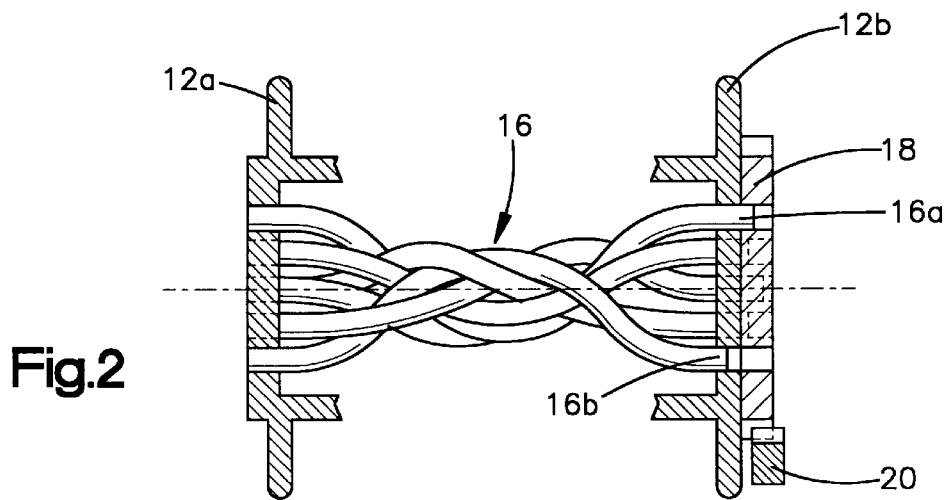
FIG. 2 shows the force limiter after having been active.

When the blocking mechanism is activated the blocking pawl 20 is caused to engage the blocking toothing of the blocking disk 18, holding it non-rotatably relative to the frame 10. Despite this the belt webbing 14 wound up on the drum 12 can be withdrawn from the latter when the torsion elements 16 are twisted about each other as soon as a defined torque is exceeded. This condition is illustrated in FIG. 2. The torsion elements 16, which can be simple pieces of metal wire having a round cross-section, are twisted about each other, as a result of which their axial length is correspondingly reduced. It is evident from FIG. 2 that one of the torsion elements 16*a* is still maintained in the corresponding through-opening of the blocking disk 18 whilst another torsion element 16*b*, shorter in length, has already been pulled out of the corresponding through-opening of the blocking disk 18. This torsion element 16*b* then contributes only little to the resistance presented by the torsion elements in counteracting any further mutual rotation of the flange 12*a*, 12*b*. Accordingly, depending on the grading of the length of the various torsion elements the force level at which a force limitation occurs can be varied over a broad range.

An additional possibility of influencing the force limiting characteristic materializes from the blocking disk 18 being axially shiftable in response to parameters relevant to a collision, more particularly the weight or mass of the vehicle occupant, the collision intensity and the presence or activation of an inflatable restraining means (gas bag).

Figure 4:
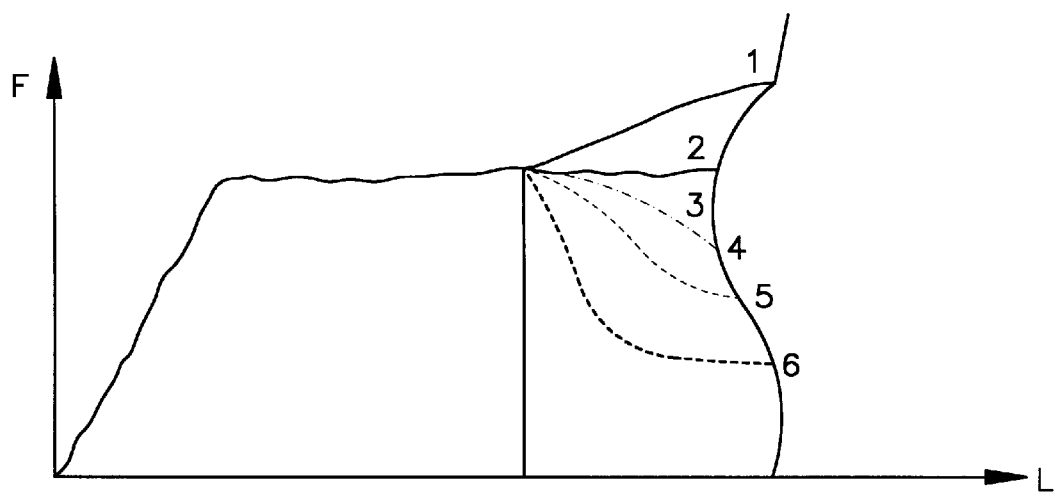
FIG. 4 is a diagram illustrating the force limiting characteristic of the force limiter in accordance with the invention as compared to that of a conventional force limiter.

FIG. 4 is a diagram of various force limiting characteristics illustrating the profile of the force F in the belt webbing 14 versus the length L of withdrawn belt webbing. The force limiting characteristic 1 features, following a steep increase, a section of near constantly remaining force, followed by a section of progressively increasing force. This corresponds to the force limiting effect of a conventional force limiter, for example having a torsion rod as the torsion element. The force limiting characteristics 2, 3, 4, 5 and 6 illustrate the force limiting characteristics possible with the force limiter in accordance with the invention which may be strongly degressive as evident from curve 6. The variation in the characteristics is achieved, on the one hand, by suitably grading the lengths of the various torsion elements and, on the other, by axially shifting the blocking disk 18 as required.

Figure 3A:
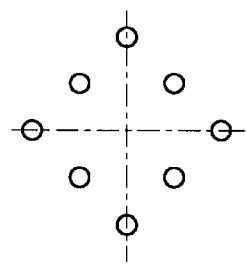
FIGS. 3a, 3b and 3c are various embodiments of the arrangement of several rod shaped torsion elements of the force limiter.
Figure 3B:
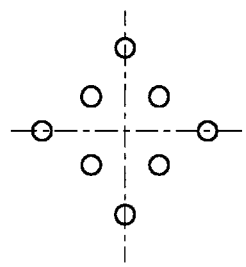
Figure 3C:
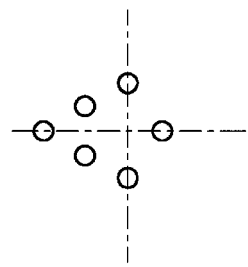

FIGS. 3*a*, 3*b* and 3*c* show various embodiments for arranging the torsion elements in a radial plane of the drum 12, this arrangement being possible both symmetrically and non-symmetrically.

Figure 5:
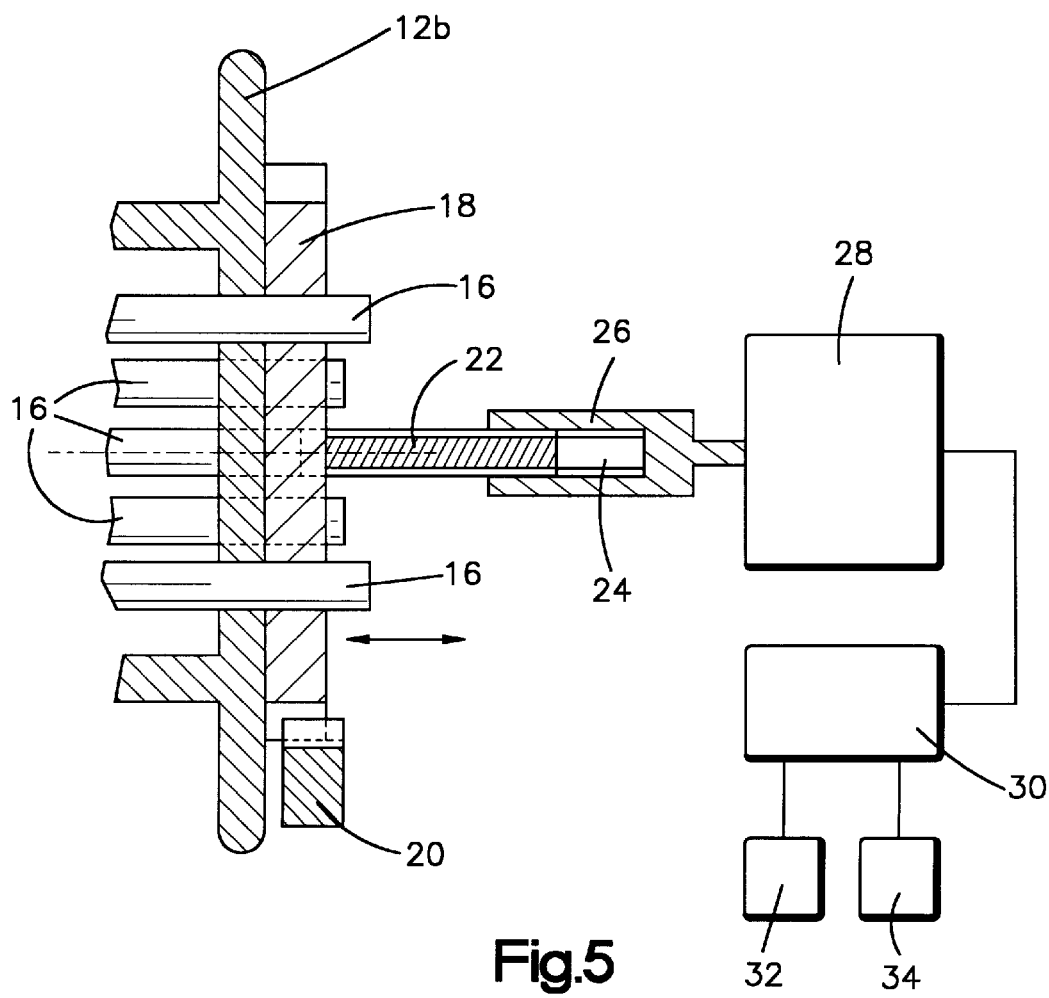
FIG. 5 shows a further embodiment of the force limiter in accordance with the invention.

FIG. 5 partly shows a force limiter wherein the blocking disk 18 is mounted on the drum 12 so as to be axially shiftable. The blocking pawl 20 has a larger width, so as to be able to engage the blocking disk 18 even when the blocking disk 18 is axially shifted. The torsion elements have differing lengths and consequently a different axial position of the blocking disk 18 results in different force limiting characteristics. For axial shifting of the blocking disk 18, a threaded bolt 22 is provided, which is connected with the blocking disk 18 in its center of rotation in a non-rotational arrangement. At the end of the threaded bolt 22 facing away from the blocking disk 18, the threaded bolt 22 engages a threaded hole 24 of a coupling part 26. The coupling part 26 is secured to the shaft of an electric motor 28. By turning the shaft of the electric motor 28, the blocking disk 18 can be shifted in the axial directions indicated by the double-sided arrow shown in FIG. 5.

The electric motor is controlled by a control unit 30 which selects the axial position of the blocking disk 18 and consequently the force limiting characteristic by taking into account the weight of the vehicle occupant, the collision intensity and the gas bag activation. These parameters are detected by sensors 32 and 34, which are connected to the control unit 30.

I claim:

1. A force limiter for a vehicular seat belt restraint system, comprising a frame, a drum with two axial ends rotatably mounted in said frame for winding up a belt webbing, a blocking disk coupled to said drum, and a blocking mechanism for selectively locking said blocking disk to said frame in a non-rotatable arrangement, wherein said blocking disk is axially held at one of said axial ends of said drum and is coupled to said drum by at least two torsion elements, said torsion elements being anchored to an opposite one of said axial ends of said drum.

2. The force limiter as set forth in claim 1, wherein said blocking disk has openings passing through said blocking disk, said torsion elements being inserted in said openings and said torsion elements protruding from said openings at a side of said blocking disk facing away from said drum.

3. The force limiter as set forth in claim 2, wherein at least one of said torsion elements has a smaller axial length than the other ones of said torsion elements.

4. The force limiter as set forth in claim 3, wherein said torsion elements have axial lengths differing from each other.

5. The force limiter as set forth in claim 1, wherein said torsion elements are essentially rod shaped.

6. The force limiter as set forth in claim 5, wherein said torsion elements have a round cross-sectional shape.

7. The force limiter as set forth in claim 3, wherein said blocking disk is mounted so as to be shiftable in axial direction on said drum.

8. The force limiter as set forth in claim 7, wherein said axial shift of said blocking disk on said drum is caused by a positioning system responding to at least one of the following parameters:
   weight of the occupant,
   collision intensity,
   gas bag activation.

* * * * *